(12) United States Patent
Van Der Touw et al.

(10) Patent No.: US 6,626,093 B1
(45) Date of Patent: Sep. 30, 2003

(54) TRANSPORTABLE RECYCLING CENTER

(75) Inventors: Hans Van Der Touw, San Bernardino, CA (US); Mathew Millhiser, Rancho Cucamonga, CA (US); Richard Graff, Pasadena, CA (US)

(73) Assignee: Nexcycle, Inc., Corona, CA (US)

( * ) Notice: Subject to any disclaimer, the term of this patent is extended or adjusted under 35 U.S.C. 154(b) by 13 days.

(21) Appl. No.: 09/696,531

(22) Filed: Oct. 25, 2000

(51) Int. Cl.[7] .............................................. B02C 21/02
(52) U.S. Cl. .................................. 100/100; 100/229 A
(58) Field of Search ............................. 100/100, 229 A

(56) References Cited

U.S. PATENT DOCUMENTS

| | | | |
|---|---|---|---|
| 3,352,230 A | | 11/1967 | Hunnicutt ..................... 100/53 |
| 4,147,100 A | | 4/1979 | Dykstra ........................ 100/48 |
| 4,152,979 A | | 5/1979 | Schmidt ....................... 100/53 |
| 4,248,389 A | * | 2/1981 | Thompson et al. ......... 100/902 |
| 4,440,284 A | | 4/1984 | DeWoolfson ............... 194/4 R |
| D301,792 S | | 6/1989 | Knauer ........................ D34/26 |
| 4,915,570 A | * | 4/1990 | Rath et al. ................. 298/23 C |
| 4,962,973 A | | 10/1990 | Allmon ....................... 312/325 |
| 4,979,866 A | | 12/1990 | Croy ........................... 414/517 |
| 5,001,977 A | * | 3/1991 | Tracy .......................... 100/102 |
| 5,029,522 A | | 7/1991 | Brisson ....................... 100/233 |
| 5,078,567 A | * | 1/1992 | Lombardo ................... 220/909 |
| D326,171 S | | 5/1992 | Brenner et al. ............... D34/3 |
| 5,111,927 A | * | 5/1992 | Schulze, Jr. ................ 100/902 |
| 5,129,318 A | * | 7/1992 | Zimmer ....................... 100/102 |
| D328,659 S | | 8/1992 | Brenner et al. ............... D34/3 |
| 5,307,607 A | | 5/1994 | Tondo .......................... 53/438 |
| 5,348,125 A | | 9/1994 | Stribling ................ 191/12.2 R |
| 5,381,732 A | | 1/1995 | Trout ............................ 100/49 |
| 5,425,458 A | * | 6/1995 | Gilcreest et al. .............. 100/45 |
| 5,441,160 A | * | 8/1995 | DeWoolfson et al. ........ 209/702 |
| 5,469,783 A | * | 11/1995 | Fry ............................. 100/173 |
| 5,490,455 A | * | 2/1996 | Conti et al. ................. 100/100 |
| 5,579,684 A | | 12/1996 | Stribling ....................... 100/48 |
| 5,664,493 A | | 9/1997 | Kim ............................. 100/92 |
| 5,690,025 A | | 11/1997 | Hawkins ....................... 100/35 |
| 5,704,558 A | * | 1/1998 | Arrott ......................... 241/100 |
| 5,718,168 A | | 2/1998 | Harrington .................. 100/226 |
| 5,842,652 A | * | 12/1998 | Warsing et al. ....... 241/101.741 |
| 5,888,027 A | | 3/1999 | Buer ........................... 406/122 |
| 5,967,330 A | | 10/1999 | Buer ......................... 209/12.1 |

* cited by examiner

Primary Examiner—William Hong
(74) Attorney, Agent, or Firm—Gardere Wynne Sewell LLP; Kenneth T. Emanuelson

(57) ABSTRACT

The present invention disclosed herein provides a transportable recycling center that has a container and a partition within the container. The partition separates a work area from a storage area. An attendant may accept recyclable materials from consumers in the work area and store the recyclable material in the storage area. After the container has been filled with recyclable material, doors on the container may be secured and the container may be loaded onto a truck and transported to a recycling facility.

17 Claims, 2 Drawing Sheets

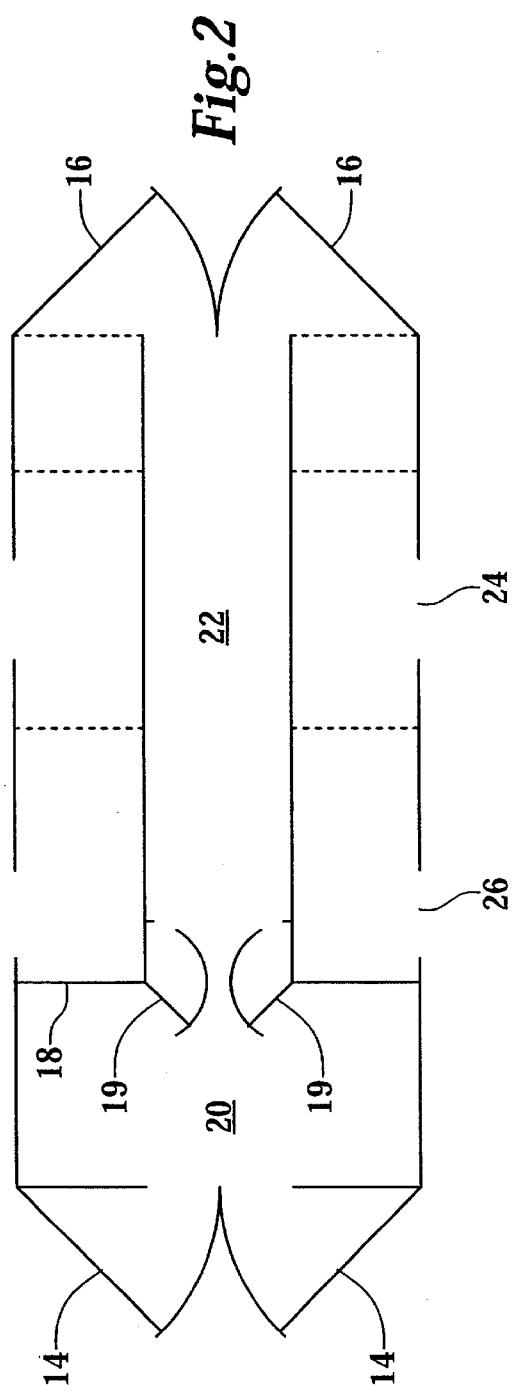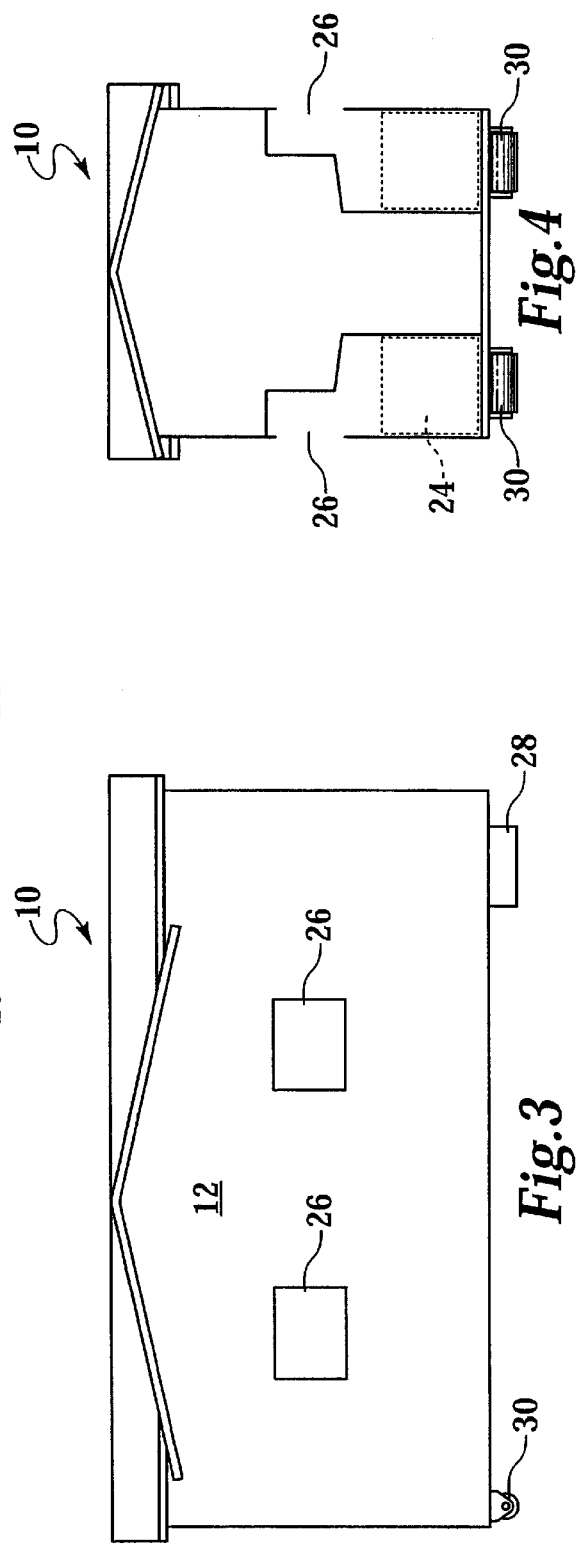

TRANSPORTABLE RECYCLING CENTER

TECHNICAL FIELD OF THE INVENTION

This invention relates in general to the field of recycling containers and in particular to a device for housing a recycling center attendant or receiving device and facilitating collection, sorting and transportation of recyclable materials.

BACKGROUND OF THE INVENTION

Without limiting the scope of the invention, its background will be described with reference to a transportable recycling center as an example.

Recycling containers have been used to collect recyclable materials such as glass, plastic and paper since public awareness prompted an interest in conserving natural resources. These containers usually are nothing more than a refuse container designated for collection of a particular material. Several containers, each for distinct materials, may be located in a common area for consumer convenience. For example, separate containers may be labeled to receive each color of glass, different types of plastic and aluminum. Consumers may visit the area and deposit their various recyclable materials in the corresponding containers.

One disadvantage to many recycling areas is that they may become cluttered with refuse and non-recyclable materials. Consumers may deposit improper materials in the containers or proper materials may be contaminated with an excessive quantity of residual product, which may contaminate other material in a container. If un-attended containers become full, consumers may simply leave the material near the container where it may be scattered by the wind or scavenging animals. Providing an attendant at a recycling area that has many separate containers may only marginally improve cleanliness. It is difficult or impossible to monitor consumers at several different containers and cost prohibitive to assign an attendant to monitor each container.

One solution is to provide a recycling center that requires all material to pass through a screening process before it is placed in the container. Screening may be performed by an attendant or a reverse vending machine (RVM). Recycling centers of this type usually require a permanent structure to house the attendant or to secure the RVM.

Permanent structures are expensive and consume valuable space. Because many recycling centers are located on the premises of retail stores, space taken by a permanent structure reduces the number of customers that may be accommodated. Reducing the number of space for customers may result in lost profits. Additionally, a permanent structure is difficult to move if a retailer needs to use the space in a different configuration or for a different purpose.

Therefore, a need has arisen for a recycling center that will not allow the recyclable materials to become mixed during collection. A need has also arisen for such a recycling center that does not add significant cost or complexity to the collection process. Further, a need has arisen for such a recycling center that does not require the costs or space associated with a permanent structure.

SUMMARY OF THE INVENTION

The present invention disclosed herein provides a transportable recycling center that has a container and a partition within the container. The partition separates a work area from a storage area. An attendant may accept recyclable materials from consumers in the work area and store the recyclable material in the storage area. After the container has been filled with recyclable material, doors on the container may be secured and the container may be loaded onto a truck and transported to a recycling facility.

In one embodiment of the present invention, a method for collecting recyclable materials is provided. The method includes the steps of placing a transportable recycling center at a location, receiving recyclable materials, sorting the recyclable materials, storing the recyclable materials in the transportable recycling center, and removing the transportable recycling center from the location.

In another embodiment of the invention, a recycling collection system includes a collection location and a transportable recycling container located at the collection location. A partition within the transportable recycling container defines a work area and a storage area.

BRIEF DESCRIPTION OF THE DRAWINGS

For a more complete understanding of the present invention, including its features and advantages, reference is now made to the detailed description of the invention taken in conjunction with the accompanying drawings in which like numerals identify like parts and in which:

FIG. 2 is a plan view of a recycling container incorporating certain embodiments of the invention;

FIG. 3 is an elevation view of a recycling container incorporating certain embodiments of the invention; and FIG. 4 is an end view of a recycling container incorporating certain embodiments of the invention.

DETAILED DESCRIPTION OF THE INVENTION

Figure 1:
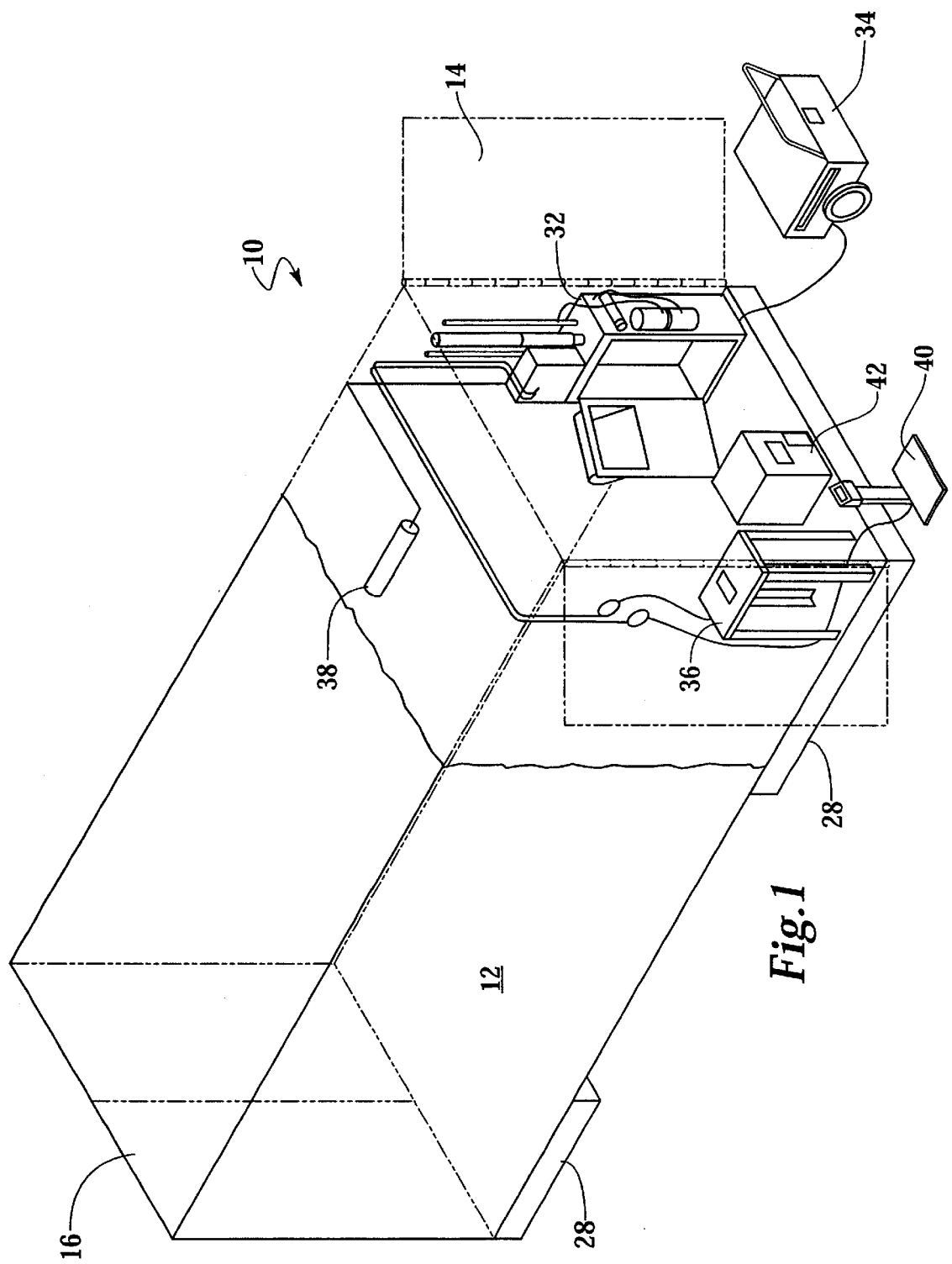
FIG. 1 is a perspective view of a recycling center incorporating certain embodiments of the invention.

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the invention.

Referring now to FIG. 1, therein is depicted a recycling center 10 that may be placed at a location such as a parking lot of a retail store, for example. The recycling center 10 has a recycling container 12 that may be configured to store recyclable material and house an attendant. As a result, the recycling container 12 may be a stand-alone recycling center 10 that does not require permanent structures to be erected at the location. Additionally, the recycling center 10 is completely portable and may be easily moved among different locations.

A front door 14 allows the attendant to access the container 12. The attendant may receive recyclable materials from a consumer through the front door 14. After the container 12 is sufficiently full of recyclable material, the front door 14 may be secured and the container 12 may be transported to a recycling facility. The recyclable material may be emptied from the container 12 through a rear door 16. The container 12 may be emptied like a dump truck by opening the rear doors 16 and tilting the container 12 rearward. The recyclable material may then be dumped in an appropriate location at a recycling facility.

A recycling center 10 may contain various accessories such as a compactor 32, a power supply 34, a table 36, a light 38 and a scale 40, for example. The container 12 may also contain a reverse vending machine (RVM) 42, discussed in greater detail herein below. One or more of these accessories may be used to help the attendant receive and store recyclable material. All of the accessories may be stored and transported within the work area 20. During hours of operation, some accessories may be moved outside the container 12 to free space within the work area 20. During other hours, accessories may be stored within the work area 20 and secured by locking the front door 14.

The compactor 32, the light 38, and the scale 40 may be powered by the power supply 34. The power supply 34 may be electricity supplied by power distribution wires from the retail store or some other source. The power supply 34 may also be portable, such as a gas-powered generator or a battery, for example. In one embodiment, the power supply 34 may be a rechargeable battery, which may be charged every evening in the retail store. In this particular example, the power supply 34 may be a cart that the attendant may easily move to and from the retail store. The power supply 34 may be used during hours of operation and re-charged in the retail store during other hours.

As shown in FIG. 2, a partition 18 may divide the container 12 into a work area 20 and a storage area 22. The partition 18 may be located in the container 12 to provide adequate room for an attendant to perform collection services in the work area 20 and maximize storage volume in the storage area 22. The work area 20 shelters the attendant from adverse weather conditions and also defines a space where the attendant may read or relax during slow collection times.

Partition doors 19 in the partition 18 allow access from the work area 20 to the storage area 22. The partition doors 19 may also separate the work area 20 from recyclable materials in the storage area 22, which helps to promote a clean, safe and visually appealing recycling center 10.

The storage area 22 of the container 12 may have one or more holding bin(s) 24 to keep different varieties of recyclable materials separate. The holding bin 24 may be particularly useful to safely store recyclable materials such as glass. Several holding bins 24 may be individually designated to receive, e.g., various colors of glass. The holding bins 24 may have individually operable dividers or doors (not depicted) to facilitate emptying the contents of the holding bins 24 while maintaining separation among the different types of recyclable materials. Each holding bin 24 may be emptied in independent succession at the proper location in the recycling facility.

As shown in FIG. 3, the holding bins 24 may be accessed from the interior of the container 12 by bin lids or from the exterior of the container 12 through a portal 26. Typically, an attendant may access the holding bins 24 from the interior of the container 12. However, as the interior of the container 12 becomes full of other recyclable material, access to some holding bins 24 from the interior of the container 12 may be difficult or impossible. As the container 12 becomes full, the attendant may deposit appropriate recyclable material into the holding bins 24 through the portal 26.

For example, if the attendant has stacked newspapers or even biscuits of high-density polyethylene in front of the holding bin 24 that is designated for green glass, the attendant may load additional green glass from the exterior of the container 12 through the portal 26 that is designated for green glass.

As shown in FIG. 4, the portals 26 may be covered by exterior portal doors. These portal doors may be secured to prevent unauthorized access to the holding bins 24, to protect the interior of the container 12 from environmental conditions, and to retain the recyclable material in the holding bins 24 during transportation. The interior bin lids may also be secured to prevent recyclable material such as glass, for example, from prematurely exiting the holding bins 24 during transport.

Collecting recyclable materials begins by transporting the container 12 to a suitable collection location such as the parking lot of a grocery store, for example. The entire recycling center 10 may be transported to and from the parking lot by a truck. Skids 28 or wheels 30 on the container 12 may facilitate loading the container 12 onto the truck. The front door 14 and the rear door 16 may be secured during transportation to retain the contents of the container 12.

In operation, consumers may return recyclable materials to the recycling center 10 and receive a deposit refund or a cash value for the recyclable material. The attendant may receive recyclable material from the consumer. The scale 40 may be used to weigh the recyclable material and determine the cash refund due to the consumer. The attendant may then sort the recyclable material and store it within the storage area 22. Some recyclable material may be placed in the holding bins 24 to store it separately from other recyclable material. The compactor 32 may be used to compact some or all of the recyclable material and increase the storage capacity of the container 12. As more completely described below, compacting the recyclable material allows more recyclable material to be stored in the container 12.

In some instances, a consumer may be able to return recyclable material during hours that the recycling center 10 is closed. One embodiment of the invention may include a RVM 42 in the container 12. The RVM 42 provides an automated refund to customers who deposit recyclable materials if an attendant is not present.

The dimensions of the container 12 may be adjusted to facilitate transportation or to minimize the space required in the parking lot. In one embodiment, for example, the container 12 is eight feet wide, eight feet, nine inches tall, and seventeen feet long. The container 12 may have these dimensions to satisfy highway transportation regulations and minimize the "footprint" of the container 12, which measures eight feet by seventeen feet in this particular example. A small footprint may be desirable because many retail store owners highly value the space available for customer parking. More parking translates to more customers and, therefore, more sales. The retail store owner is better served by the container 12 if it consumes less parking area than an alternative recycling center.

Although the container 12 consumes relatively little area on the parking lot, total recyclable material storage capacity is similar to larger containers because of the interior configuration and compaction techniques. Exterior dimensions that fulfill space and transportation requirements must be balanced with interior dimensions to maximize storage capacity. The recycling center 10 may be equipped with a compactor 32 to crush various recyclable materials. The compactor 32 allows an attendant to crush recyclable material into biscuits, which may be neatly stacked in the storage area 22 of the container 12. Compacting recyclable materials increases the storage capacity of the container 12 by increasing storage density.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is, therefore, intended that the appended claims encompass any such modifications or embodiments.

What is claimed is:

1. A recycling center comprising:
   a transportable generally-rectangular container having a front end, a rear end, and at least one side wall;
   a partition disposed within the container between the front end and the rear end, dividing the container into a work area between the partition and the front end and a storage area between the partition and the rear end;
   a front door, disposed in the front end of the container;
   a rear door, disposed in the rear end of the container;
   a partition door, disposed in the partition;
   a portal, disposed in the side wall;
   a holding bin, disposed within the storage area adjacent to the portal, having a top opening;
   a compactor within the container to compact the contents of the storage area; and
   a power supply to power the compactor.

2. The recycling center of claim 1 wherein the partition has a door connecting the work area and the storage area.

3. The recycling center of claim 1 wherein the power supply is a rechargeable battery.

4. The recycling center of claim 1 further comprising at least one holding bin in the storage area.

5. The recycling center of claim 4 wherein the at least one holding bin is accessible from the, exterior of the container through a portal.

6. The recycling center of claim 1 further comprising a reverse vending machine.

7. A method for collecting recyclable materials comprising the steps of:
   placing a transportable generally-rectangular recycling center at a location, the transportable recycling container comprising
      a partition disposed within the container between the front end and the rear end, dividing the container into a work area between the partition and the front end and a storage area between the partition and the rear end;
      a front door, disposed in the front end of the container;
      a rear door, disposed in the rear end of the container;
      a partition door, disposed in the partition;
      a portal, disposed in the side wall;
      a holding bin, disposed within the storage area adjacent to the portal, having a top opening;
   receiving recyclable materials;
   sorting the recyclable materials;
   storing the recyclable materials in the transportable recycling center;
   compacting the recyclable materials; and
   removing the transportable recycling center from the location.

8. The method recited in claim 7 wherein compacting is accomplished by a battery-powered compactor.

9. The method recited in claim 7 further comprising the step of sorting the recyclable materials into at least one holding bin in a storage area.

10. The method recited in claim 9 further comprising the step of placing the recyclable materials into the at least one holding bin from the exterior of the container through a portal.

11. A recycling collection system comprising:
    a collection location;
    a transportable recycling container located at the collection location; and
    a partition disposed within the container between the front end and the rear end, dividing the container into a work area between the partition and the front end and a storage area between the partition and the rear end;
    a front door, disposed in the front end of the container;
    a rear door, disposed in the rear end of the container;
    a partition door, disposed in the partition;
    a portal, disposed in the side wall;
    a holding bin, disposed within the storage area adjacent to the portal, having a top opening.

12. The system of claim 11 further comprising a compactor within the work area.

13. The system of claim 12 wherein the compactor is battery-powered.

14. The system of claim 11 wherein the transportable recycling container has a front door to access the work area and to load the storage area and a rear door to unload the storage area.

15. The system of claim 11 wherein the storage area has at least one holding bin.

16. The system of claim 15 wherein the holding bin is accessible from the exterior of the container through a portal.

17. A recycling center comprising:
    a transportable generally-rectangular container having a front end and a back end;
    a partition disposed within the container between the front end and the rear end, dividing the container into a work area between the partition and the front end and a storage area between the partition and the rear end;
    a front door, disposed in the front end of the container;
    a rear door, disposed in the rear end of the container;
    a partition door, disposed in the partition;
    one or more holding bins located in the storage area;
    one or more portals in the exterior of the container to access the one or more holding bins;
    a battery-powered compactor accessible from the work area; and
    a portable, rechargeable battery to power the compactor.

* * * * *